United States Patent [19]

Nijhuis

[11] Patent Number: 4,567,625
[45] Date of Patent: Feb. 4, 1986

[54] SCALDING MACHINE FOR TREATING THE CARCASS OF A SLAUGHTERED ANIMAL

[75] Inventor: Gerrit J. Nijhuis, Winterswijk, Netherlands

[73] Assignee: Machinefabriek G. J. Nijhuis B.V., Netherlands

[21] Appl. No.: 676,569

[22] Filed: Nov. 30, 1984

[30] Foreign Application Priority Data

Dec. 2, 1983 [NL] Netherlands .................. 8304149

[51] Int. Cl.$^4$ .............................................. A22B 5/08
[52] U.S. Cl. ...................................................... 17/15
[58] Field of Search .................. 17/11.2, 65, 13, 15, 17/51

[56] References Cited

U.S. PATENT DOCUMENTS 1,388,898  8/1921  Schmidt ................................ 17/13
1,532,039  3/1925  Chazen .
1,617,146  2/1927  Caffee .
2,820,246  1/1958  Thomas ................................ 17/15

Primary Examiner—Willie G. Abercrombie
Attorney, Agent, or Firm—Arnold, White & Durkee

[57] ABSTRACT

Scalding machine for treating the carcass of slaughtered pigs, said machine comprising at least two compartments (4,5) disposed one behind the other, each compartment (4,5) having a cylindrical bottom (2,3) concentric with the axis of rotation of a drum (8,9) mounted for rotation above each compartment (4,5) and being provided at its periphery with spaced apart rows of carrier arms (12-19), the construction being such that the turning circles (36,37) of the arms (12-19, 12'-19') of successive drums (8,9) intersect each other and the arms of one drum are in vertical planes (20-25) which lie inbetween the vertical planes (27-32) of the arms of the next drum, which drums preferably are driven intermittently in synchronism such that when one drum rotates the other is stationary and vice versa.

3 Claims, 2 Drawing Figures

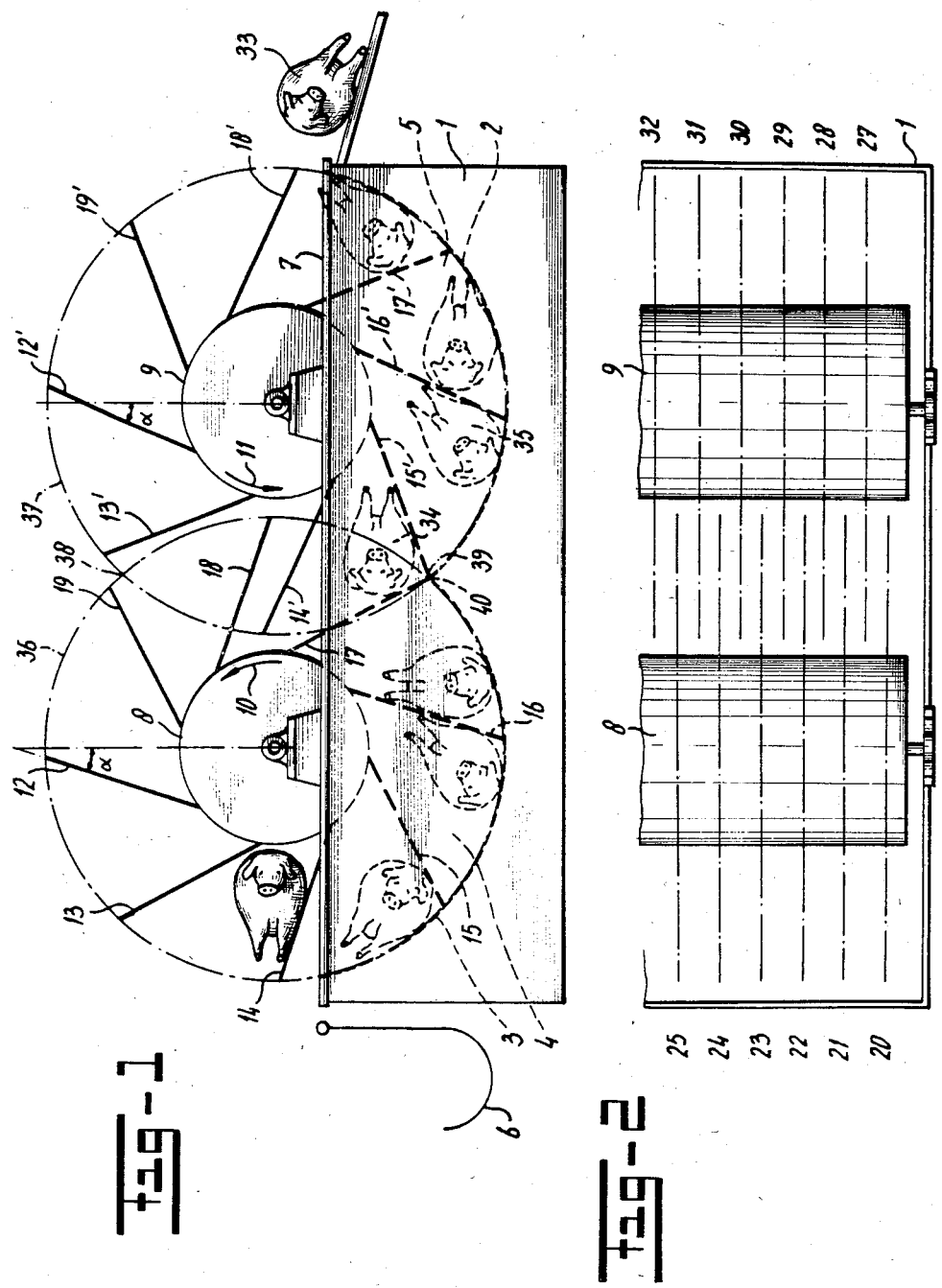

SCALDING MACHINE FOR TREATING THE CARCASS OF A SLAUGHTERED ANIMAL

The invention to a scalding machine for treating the carcass of a slaughtered animal, particularly a pig, consisting of a scalding tank having more than one compartment, these compartments being disposed one behind the other and being provided with conveying means for moving the carcasses through each compartment and transferring each carcass from one compartment to the next, these conveying means in each compartment consisting of a drivable drum disposed with its horizontal axis lying transversely to the direction of passage and having a plurality of rows, distributed uniformly over the periphery of the drum, of outwardly projecting carrier arms which are disposed in the peripheral direction of the drum in vertical planes which are spaced apart from one another and are at right angles to the axis, each row of arms lying in a plane parallel to the axis of the drum and at such an angle to an intersecting radial plane that said plane of each row of arms slopes downwards at the respective location of the horizontal radial plane through the upwardly turning portion of the drum, said rows of arms forming spaces for receiving a carcass, while the bottoms of the compartments are cylindrical in shape, concentric to the axis of the drum in question and adjacent to the turning circle of the ends of the appertaining arms, successive drums being adapted to be driven synchronously in such a manner that a row of downwardly sloping arms passing but of one compartment can transfer the carcass to a downwardly moving row of arms of the following drum.

A scalding machine of this kind is known in practice from a drawing in a brochure. This scalding machine has compartments containing drums having carrier arms, disposed one behind the other in such a manner that the operating circles of the ends of the carrier arms on one drum extend almost to those of the following drum. These machines, as shown in the drawing, cannot work well because the transfer of the carcasses from the arms of the first drum to those of the following drum has not been effectively solved.

In a scalding tank the carcasses, particularly those of pigs, are prepared for an unhairing operation. To achieve this, the carcasses must remain a certain time in the hot scalding water. On the inlet side the carcasses are laid in the spaces formed between rows of arms, in a region where the arms form a surface which is still sloping upwards. The drum then moves the carcasses through the scalding tank. This movement may be continuous, but is preferably stepped in coordination with the introduction of carcasses. At the outlet of each scalding tank the arms of the carrying rows of arms slope downwards and can thus discharge the carcass being treated. In practice this is frequently done by using only a single scalding tank provided with a drum, which discharges directly, or via a rotatable chamber, into a unhairing machine working with scrapers and optionally with flames. The invention takes as its starting point a scalding machine in which a plurality of scalding compartments provided with drums and carrier arms are disposed one behind the other. The carcasses coming from the first compartment are thus transferred by the downwardly sloping rows of arms to the arms of the following drum, which moves the carcass through the following compartment. Carcasses tend to float and then will not, or will not at the proper time, pass out of the region of the arms of the one drum into a space in the following drum.

The drums must obviously be synchronised in such a manner that the carcasses sliding off one row of arms will not strike against the ends of the arms of the following drum.

In scalding machines of the type described the problem also arises that they take up considerable space in the slaughterhouse. With an increase of the number of slaughtered animals, particularly pigs, to be treated per hour, the capacity of scalding machines of this type must be increased. This can be done by widening the drum in the direction of its axis, in such a manner that two carcasses can be placed next to each other in each space. It can also be done by increasing the diameter of the drum, so that a larger number of carcasses can be accommodated in the tank. If only a single drum is used, this will mean particularly large dimensions in the direction of passage and in height, which is often prohibitive. The other possibility consists in doubling or tripling the machine in the direction of passage, as is known on paper. Although this reduces the dimensions in respect of height, the length is doubled.

The invention now seeks to provide a scalding machine of the previously described type, having a plurality of drums, in which however the length in the direction of passage is reduced and transfer takes place faultlessly.

According to the invention this aim is achieved in that the vertical planes of the arms of one drum lie between the vertical planes of the arms of the following drum, that the turning circles of the ends of the arms of the one drum cross those of the following drum and the lowest crossing point lies right above the transition of the cylindrical bottom of the one compartment into the cylindrical bottom of the other compartment. Because the carrier arms of the one drum engage between those of the following drum, the axes of the drums can be placed far closer to one another. The drums turn in the same direction, and this means that at the points where the arms move between one another they move in opposite directions. This however does not in any way result in conflict in connection with the carcasses, provided that care is taken to ensure that the synchronisation of the rotational movements of drums following one another is such that the bottom crossing points of the operating circles lies right above the transition from one compartment to the other compartment. The carcasses then slide from the one set of downwardly sloping arms directly onto the set of arms, lying in a lower position, of the space on the following drum, and are then conveyed by the latter through the next compartment.

It is known for the drum to move stepwise over a distance corresponding to one space at a time.

According to the invention it is now of particular importance that the drives of the drums should be synchronised in such a manner that one drum moves while the other is stationary, and vice versa. There is then in fact no risk that arms moving towards one another on successive drums will grip and damage a carcass. At the moment when a carcass is discharged by one drum, when the sloping plane of the arms is directed towards the beginning of the bottom of the following compartment and the carcass has been received on a row of arms on the following drum, the latter will turn one step onwards while the carcass, which is supported by the arms of the stationary drum, falls into the compartment and is then carried by the cylindrical bottom of the compartment.

The invention will now be further explained with reference to the drawings.

FIG. 1 is a side view of the scalding machine according to the invention.

FIG. 2 is a top plan view of the machine according to the invention.

THe scalding machine shown in the drawings consists of a tank 1 divided by two bottoms 2 and 3, each of which is in the form of part of a cylinder, into two compartments 4 and 5 respectively.

On the left of the tank 1 is disposed a feed mechanism 6 in the form of a rack adapted to swing up, with the aid of which a carcass can be introduced into the machine.

On the top edge 7 of the tank 1 are mounted two drums 8 and 9 respectively, each provided with a drive mechanism (not shown) whereby the drums can be rotated in the direction of the arrows 10 and 11 respectively. The drum 8 is provided with rows of arms 12 to 19. Each row of arms, which are spaced apart from one another in vertical planes 20 to 25 as indicated in FIG. 2, lies in a plane which forms an acute angle with the radius and extends parallel to the axis of the drum 8. This angle is such that, as shown on the left in FIG. 1, a carcass 26 introduced into the machine is deposited on an inwardly sloping surface. On rotation of the drum 8, this carcass in the space formed between the arms 13 and 14 is carried into the liquid in the compartment 4 and gradually conveyed through it.

The second drum 9 is in the same way equipped with arms 12' to 19' which form the same angle with the radius. The arms 12' to 19' are situated in planes 27 to 32 which lie between the planes 20 to 25. THe arms 12' to 19' thus move between the arms 12 to 19.

The two drums rotate stepwise in such a manner that they are turned onwards in steps corresponding to the size of the space formed between successive arms.

The rotation of the drum 8 is synchronised with that of the drum 9 in such a manner that at the moment when a row of arms is able to discharge a carcass, as indicated for the arms 17 in FIG. 1, this carcass is taken over by the arms 15' of the drum 9. The carcass then moves, while supported by the arms 17 and resting on the arms 15', into the second tank 5 and is finally discharged from the latter, as indicated at 33, by sliding off the downwardly sloping arms 18'.

The two drums 8 and 9 are preferably driven stepwise in such a manner that when the drum 8 has reached the position shown in FIG. 1, in which a carcass can be transferred to the following drum, the drum 8 stops and the drum 9 starts to turn, so that the carcass 34 is discharged from the space formed between the arms 17, 14' and 15' to the position occupied by the carcass 35.

As can be seen in FIG. 1, the operating circles 36 and 37 of the arms cross each other at the top points 38 (of no concern here) and at the bottom point 39 situated at the transition 40 from the bottom 3 to the bottom 2. The synchronization of the drives of the two drums is then such that at the moment when the arms 17 are directed towards the point 39 the arms 15' are directed towards the same point.

Given sufficient space, it is conceivable for the carcass 34 not to be in contact with the arms 17 during its falling movement, so that it cannot be damaged by the upwardly moving arms 17. In this case a continuous movement of the drums is conceivable.

However, a stepwise movement is preferable because this makes it possible for the two drums to be positioned as close as possible to one another and thus to achieve a short construction of the scalding machine in the conveying direction.

I claim:

1. Scalding machine for treating the carcass of a slaughtered animal, particularly a pig, comprising: a scalding tank having more than one compartment, these compartments being disposed one behind the other and being provided with conveying means for moving the carcasses through each compartment and transferring each carcass from one compartment to the next, these conveying means in each compartment consisting of a drivable drum disposed with its horizontal axis lying transversely to the direction of passage and having a plurality of rows, distributed uniformly over the periphery of the drum, of outwardly projecting carrier arms which are disposed in the peripheral direction of the drum in vertical planes which are spaced apart from one another and are at right angles to the axis, each row of arms lying in a plane parallel to the axis of the drum and at such an angle to an intersecting radial plane that said plane of each row of arms slopes downwards at the respective location of the horizontal radial plane through the upwardly turning portion of the drum, said row of arms forming spaces for receiving a carcass, while the bottoms of the compartments are cylindrical in shape, concentric to the axis of the drum in question and adjacent to the turning circle of the ends of the appertaining arms, successive drums being adapted to be driven synchronously in such a manner that a row of downwardly sloping arms passing out of one compartment can transfer the carcass to a downwardly moving row of arms of the following drum, the vertical planes of the arms of one drum lying between the vertical planes of the arms of the following drum, the turning circles of the ends of the arms of the one drum crossing those of the following drum and the lowest crossing point lying right above the transition of the cylindrical bottom of the one compartment into the cylindrical bottom of the other compartment.

2. Scalding machine according to claim 1, wherein: the drums are moved stepwise over a distance corresponding to each space formed between rows of arms, the drums being driven synchronously in such a manner that one drum moves while the following drum is stationary, and vice versa.

3. Scalding machine according to claim 1 or claim 2, wherein: the rows of arms of the successive drums are so disposed and the drums are driven in such a manner that whenever one row of arms is situated with its ends at the location of the bottom crossing point of the operating circles the ends of a row of arms of the following drum are situated at least close thereto.

* * * * *